United States Patent [19]
Nakagawa et al.

[11] Patent Number: 5,678,809
[45] Date of Patent: Oct. 21, 1997

[54] SPRING MEMBERS

[75] Inventors: Takao Nakagawa; Masaharu Tachibana; Mihoko Yamashita; Yasuo Nozaki; Toshihiro Sato, all of Kawaguchi, Japan

[73] Assignee: Across Co., Ltd., Kawaguchi, Japan

[21] Appl. No.: 580,738

[22] Filed: Dec. 29, 1995

Related U.S. Application Data

[63] Continuation-in-part of Ser. No. 251,929, Jun. 1, 1994, Pat. No. 5,503,783.

[51] Int. Cl.$^6$ .................................................. F16F 1/06
[52] U.S. Cl. ............................................ 267/148; 267/166
[58] Field of Search ..................................... 267/148, 149, 267/167, 166; 423/447.8, 445 R

[56] References Cited

U.S. PATENT DOCUMENTS

| | | |
|---|---|---|
| 3,943,213 | 3/1976 | Whittaker et al. . |
| 4,006,881 | 2/1977 | Gaillard . |
| 4,260,143 | 4/1981 | Kliger ............... 267/166 |
| 4,412,675 | 11/1983 | Kawakubo . |
| 4,544,599 | 10/1985 | Buttazzoni . |
| 4,772,502 | 9/1988 | Okura et al. . |
| 4,902,453 | 2/1990 | Okura et al. . |
| 5,503,783 | 4/1996 | Nakagawa et al. ............ 267/148 |

FOREIGN PATENT DOCUMENTS

| | | |
|---|---|---|
| 507564 | 10/1992 | European Pat. Off. . |
| 086150 | 8/1983 | Germany . |
| 63-40764 | 2/1988 | Japan . |
| 2-80639 | 3/1990 | Japan . |
| 6-264947 | 9/1994 | Japan . |

OTHER PUBLICATIONS

H. Buhl et al, "Carbon Fibre Spring for High-Temperature Application", Journal of Crystal Growth 131 (1993) pp. 470–472.

Jan Chlopek et al "Mechanical Properties of Carbon-Carbon Composites", Ceramics Internation 19 (1993) 251–257.

Patent Abstract of Japan, vol. 18 No. 163 (C–1181) Dec. 1993 re JP-A 5-330915.

Chemical Abstracts, vol. 115 #4, Jul. 1991.

Primary Examiner—Douglas C. Butler
Attorney, Agent, or Firm—Cushman, Darby & Cushman IP Group of Pillsbury Madison & Sutro LLP

[57] ABSTRACT

A spring member made of a carbon fibers/carbon composite material in which carbon fibers are dispersed in a matrix of graphite. The spring member has a spring constant in a range of 0.1 to 25 kg/mm and a density of about 1.5 to 3.0 g/cm$^3$. For use in high temperature severe conditions a ceramic material is incorporated into the surface of the spring member.

26 Claims, 6 Drawing Sheets

FIG_3
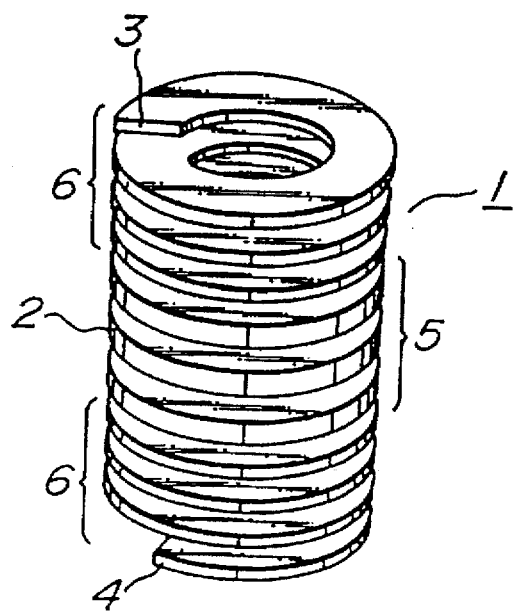
FIG_4
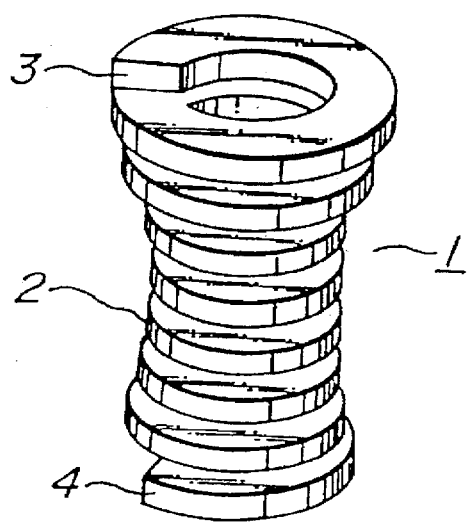

FIG_5
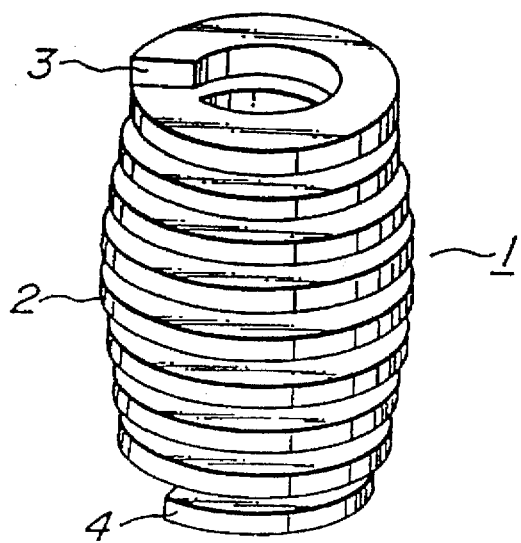
FIG_6
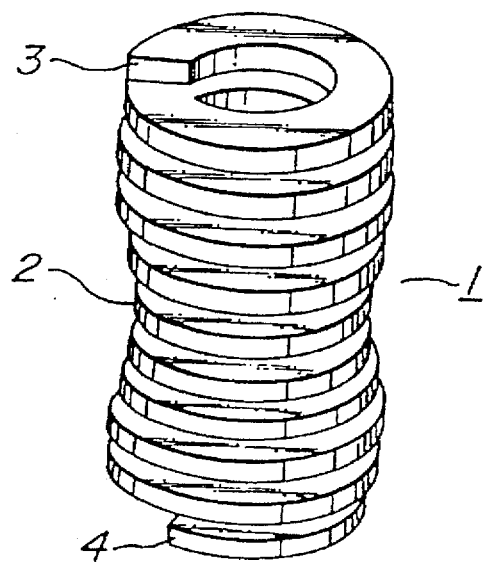

about 2t
(t: thickness)

$t = \dfrac{T_1 + T_2}{2}$

FIG_10a
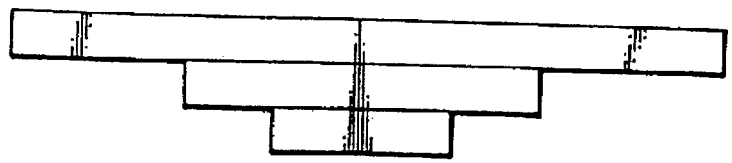
FIG_10b
FIG_11
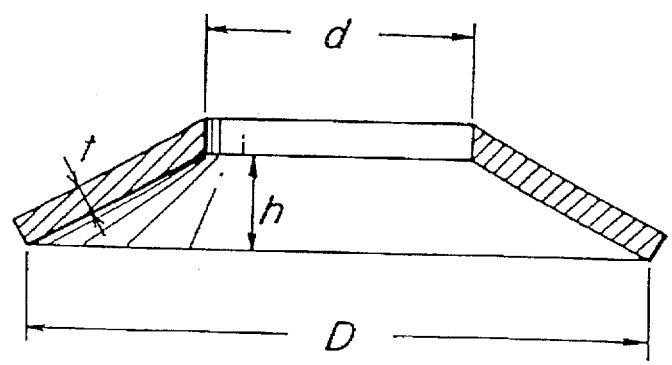

SPRING MEMBERS

This application is a continuation-in-part of our application Ser. No. 08/251,929 filed Jun. 1, 1994, now U.S. Pat. No. 5,503,783.

BACKGROUND OF THE INVENTION

(1) Field of the Invention

The present invention relates to spring members made of carbon fibers/carbon composite material (hereinafter referred to briefly as "C/C composite material") which have not formerly existed.

(2) Related Art

The spring members such as spiral springs have been used as mechanical elements in a variety of machines, equipment, mechanics, etc. Therefore, the spring members are indispensable and important parts in the fields of daily domestic products, industrial products, etc.

The spring members have been conventionally and generally made of metallic materials. Further, production of spring members made of ceramic materials having thermal resistance, wear resistance and corrosion resistance has been recently investigated and some such ceramic spring members have begun to be used.

Meanwhile, attempts have been made to reduce the weight of automobile vehicles and aircraft principally to enhance fuel consumption efficiency. As one countermeasure therefor, reduction in weight of the spring members has been demanded. Further, in various industrial machines, light weight spring members have been demanded for various purposes.

However, since the spring members made of metallic materials have poor heat resistance, they cannot exhibit sufficient spring performance under high temperature use conditions. Therefore, the metallic spring members cannot be used per se or cannot be used for an extended time period at such high temperature use conditions. As for metallic springs, stainless steel, low-alloy steel, tool steel and the like are principally used. However, these materials, which are called heat resistive alloys, undergo conspicuous reduction in strength and conspicuous deformation at temperatures over 400° C. so that the materials are rapidly permanently set. Accordingly, the metallic spring members cannot be used under the above environmental conditions. Furthermore, even super heat resistive alloys such as Inconey or Hastalloy suffer conspicuous reduction in strength and conspicuous deformation at temperatures over 700° C. so that they undergo permanent set. Therefore, these super heat resistive materials cannot be used for spring members under such environmental conditions.

Further, some metallic spring members are generally likely to corrode, and their abrasion resistance is poor. Further, if a magnetic field acts upon the spring member, it is likely to be magnetized, so that a limitation is posed upon use of the spring members under an environment in which the spring members may be influenced by magnetic fields.

On the other hand, when spring members made of ceramics such as silicon nitride or zirconia are used repeatedly at high temperatures, there is a high possibility that they may be broken. Therefore, such spring members have low heat impact resistance, and when the temperature exceeds a certain temperature in a range of 500°–1000° C., their strength rapidly decreases, and they are deformed or broken. Further, since the ceramics have no toughness, the ceramic spring member is likely to be broken so that it is extremely troublesome or difficult to handle such spring members so as not to break them. Further, although Buhl, et al: "Carbon fiber spring for high-temperature application", JOURNAL OF CRYSTAL GROWTH 131(1993), pp 470–472, discloses a helical spring of a C/C material, such a fiber spring will never withstand mechanical use in severe conditions due to its small spring constant.

SUMMARY OF THE INVENTION

It is therefore an object of the present invention to provide completely novel and not conventionally existing spring members made of a C/C composite material having high strength, high elasticity and light in weight, said spring members having excellent spring performance at high temperature, high hardness, high abrasion resistance, high corrosion resistance, high toughness, large heat impact resistance and high density.

It is further object of the present invention to provide processes for producing such spring members.

The term "spring members" used herein is intended to include helical compression springs, helical tension springs, spring washers, flat washers, laminated springs, torsion springs, garter springs, volute springs, torsion bar springs, spiral springs, conical springs, contacted type spiral springs, coned disk springs, ring springs, retaining rings, spring pins, spring plate nuts, springs for seats, etc. That is, the present invention is applicable to all the above springs.

In order to solve the above-mentioned conventional problems, the present inventors have made strenuous studies noting the C/C composite materials having high strength, high elasticity and light weight, and accordingly discovered that the spring members having not only excellent spring performance at high temperatures, which were unattainable by the conventional spring members, but also high hardness, high abrasion resistance, high corrosion resistance, high toughness, high heat impact resistance, and high density can be obtained by using the C/C composition materials. The present inventors have accomplished the present invention based on this discovery.

That is, a spring member according to the present invention may be used in a state that opposite ends of the spring member are supported by supporting members, and is characterized by being made of a carbon fibers/carbon composite material (C/C composite material). The composite material includes carbon fibers dispersed in a matrix composed namely of graphite. The spring member has a spring constant in a range of 0.1 to 2.5 kg/mm.

The term "carbon fibers/carbon composite material (C/C composite material)" used herein is intended to mean a composite material in which filaments of carbon fibers are dispersed in a matrix composed mainly of graphite. The fibers in the raw yarn or sheet extend in a longitudinal direction in the case of the yarn member. In the case of the tape member and the sheet member, the fibers in the raw yarn or sheet may be extended in one or more directions. The volume percentage of the carbon fibers in the C/C composite material used in the present invention is preferably 10–80%, more preferably 20–70%. Preferably, the spring member has a density of 1.5 to 3.0 g/cm$^3$.

While the above spring member considerably improves the spring performance as compared with the conventional spring members and enable its use under the severer conditions, we have discovered that still further improvements are desired to satisfy the requirements in use under high temperature severe conditions, such as abrasion resistance, acid resistance, carburization resistance, surface hardness and surface smoothness. Another aspect of the invention to effect the desired further improvements includes incorporating a spring performance-improving ceramic material into its surface portion by preliminarily incorporating such a ceramic material into a surface portion of the matrix of the C/C composite material or by coating the surface of the spring member with the ceramic material. In case that the surface of the spring member is coated with the ceramic material, the coating is ordinarily made after graphitization, although it may be done before the graphitization.

These and other features and advantages of the present invention will be apparent from the following description of the invention when taken in conjunction with the attached drawings and claims, with the understanding that some modifications, variations and changes of the same could be easily made by the skilled person in the art to which the invention pertains.

BRIEF DESCRIPTION OF THE DRAWINGS

For a better understanding of the invention, reference is made to the attached drawings, wherein:

FIG. 3 is a perspective view of a third embodiment of a helical spring made of the carbon fibers/carbon composite material (C/C composite material) according to the present invention;

FIG. 4 is a perspective view of a fourth embodiment of a helical spring made of the carbon fibers/carbon composite material (C/C composite material) according to the present invention;

FIG. 5 is a perspective view of a fifth embodiment of a helical spring made of the carbon fibers/carbon composite material (C/C composite material) according to the present invention;

FIG. 6 is a perspective view of a sixth embodiment of a helical spring made of the carbon fibers/carbon composite material (C/C composite material) according to the present invention;

FIGS. 10(a) and 10(b) illustrate a laminated spring as a still further embodiment made of the carbon fibers/carbon composite material (C/C composite material) according to the present invention; and FIG. 11 illustrates a coned disk spring as a still further embodiment made of the carbon fibers/carbon composite material (C/C composite material) according to the present invention.

DETAILED DESCRIPTION OF THE INVENTION

Figure 1:
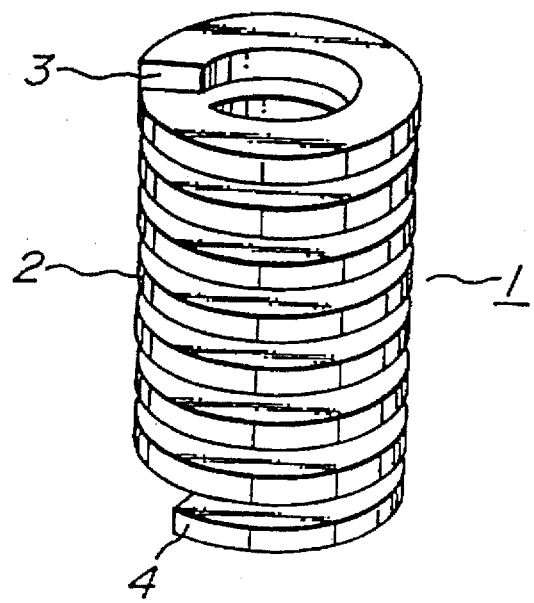
FIG. 1 is a perspective view of a first embodiment of a helical spring made of a carbon fibers/carbon composite material (C/C composite material) according to the present invention.
Figure 2:
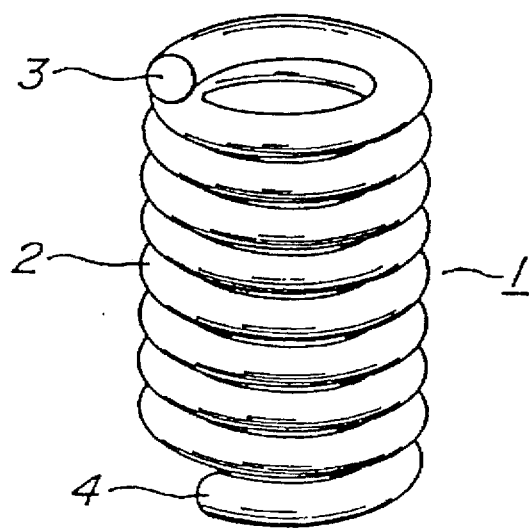
FIG. 2 is a perspective view of a second embodiment of a helical spring made of the carbon fibers/carbon composite material (C/C composite material) according to the present invention.

In the following, the spring members made of the carbon fibers/carbon composite material (C/C composite material) according to the present invention will be explained.

As the spring members according to the present invention, the term "spring members" used herein intend to include helical compression springs, helical tension springs, spring washers, flat washers, laminated springs, torsion springs, garter springs, volute springs, torsion bar springs, spiral springs, conical springs, contacted type spiral springs, coned disk springs, ring springs, retaining rings, spring pins, spring plate nuts, springs for seats, etc. That is, the present invention is applicable to all the above springs, in which a wire member of the spring member is spirally or helically wound around its central axis. The cross sectional shape of the wire member may take any appropriate form such as a circular form, an elliptical form or a rectangular form. The diameter or cross sectional size of the wire member may be appropriately selected depending upon uses and required physical properties such as spring constant. The pitch of turns of the wire member of the helical or spiral spring member, the gap between adjacent turns of the wire member and the outer diameter of the helical or spiral spring member may also be appropriately set to meet desired spring performance. The pitch of the helically wound wire member may be set constant or axially varied in the axial direction of the spring member. The outer profile of the helical spring member may be appropriately designed, for example, in a cylindrical form, a middle portion-throttled cylindrical form, a middle portion-swelled cylindrical form, or a gradually throttled cylindrical form in which the outer diameter of the spiral spring is gradually reduced from one end to the other.

As the C/C composite material to be used in the present invention, use may be made of a C/C composite material produced by a conventional process such as an impregnating process or a CVD process or a C/C composite material produced by a preformed yarn process. The C/C composite material produced by the preformed yarn process is preferably used.

Such C/C composite materials have light weight, high strength, high elasticity and large thermal shock resistance, and they are difficult to deform even if repeatedly subjected to temperature changes. Thus, they are effectively used for muffles, jigs, boxes, trays, etc. for firing at high temperatures.

(1) Production of the C/C Composite Material

The C/C composite material may be produced by the any one of following processes.

(a) According to the CVD process, carbon fibers are preliminarily shaped in a simple form, which are placed and heated at a high temperature in a furnace, and then carbon is deposited and solidified on the surface of the shaped carbon fibers by passing a hydrocarbon gas through the furnace and depositing and solidifying carbon on the surface of the carbon fibers through decomposing the hydrocarbon.

(b) Alternatively, the C/C composite material to be used in the present invention may be produced by shaping a bundle of, a woven cloth of, or an unwoven cloth of carbon fibers in a given form by using a thermosetting resin such as a phenol resin or an epoxy resin and carbonizing the resin through heating in an inert gas atmosphere.

(c) Further, the C/C composite material to be used in the present invention may be produced by carbonizing a resin molding reinforced by carbon fibers through firing, impregnating a resin into voids formed by a decomposed material escaping during carbonization of the resin, carbonizing the resin, and repeating the above steps.

In the present invention, the C/C composite material produced by the preformed yarn process may be particularly preferably used. A preformed yarn may be produced by a process disclosed in U.S. Pat. Nos. 4,772,502 and 4,902,453 of which the disclosures are incorporated herein by reference. That is, the preformed yarn includes a core of a multiplicity of inorganic reinforcing fibers; a mixed powder provided in the interstices between the fibers and including a finely divided carbonaceous binder pitch and a finely divided coke; and a flexible sleeve formed of a thermoplastic resin and surrounding the core. The performed yarn process for the production of the C/C composite material is also disclosed in these U.S. Patents.

In the case of the preformed yarn, as mentioned above, the flexible covering (that is, a sleeve) made of a thermosetting resin is provided around the outer peripheral surface of a bundle of the carbon fibers.

(2) Carbon Fibers to be Used in the C/C Composite Material

As carbon fibers to be used in the C/C composite material for the present invention, either pitch-origin carbon fibers or PAN-origin fibers may be used. The pitch-origin carbon fibers may be obtained by formulating a spinning pitch from a petroleum pitch or coal tar pitch as a starting material, spinning it through melting, making the resulting fibers insoluble, and carbonizing the fibers. The PAN-origin carbon fibers may be obtained by making fibers of an acryl nitrile polymer or copolymer fireproof and carbonizing the fibers.

(3) Bundle of Carbon Fibers

It is preferable that a bundle of carbon fibers used in the preformed yarn has a filament denier of about 0.05 to about 600 and the number of filaments being about 50 to about 300,000. More preferably, the filament denier is about 0.25 to about 16 and the number of filaments is about 100 to about 48,000. The thickness of the sleeve is generally about 5 μm to about 1000 μm to attain the formation of the uniform sleeve and the flexibility of the preformed yarn. About 10 μm to 30 μm is preferable.

Therefore, it is preferable that the diameter of the preformed yarn including a powder such as powdery pitch and coal, which is finally converted to a matrix is in a range of about 0.1 mm to about 10 mm, more preferably about 0.5 mm to about 5 mm. When the sleeve is provided around the outer periphery of a bundle of the carbon fibers, the content of the reinforcing carbon fibers in the preformed yarn may be arbitrarily and preferably selected in a range of about 5 vol % to about 70 vol % in order to obtain a desired reinforcing effect and a molding having a high and uniform quality. The sectional shape of the preformed yarn may be circular, elliptical, rectangular, or of a non-uniform shape.

The thermoplastic resin to be used as the flexible sleeve-shaping material in the preformed yarn is a resin which can be completely melted at a shaping temperature in a post-treatment. For example, polymers such as polyamide, polyester, polyethylene, polypropylene, polystyrene, polyfluoride vinylidene, polyamideimide, polyimide, polyetherimide, polyethersulfone, polyetherether ketone, and polyphenylene sulfide may be recited as such a thermoplastic resin. More specifically, as the polyamide fibers, fibers made of a homopolymer or copolymer such as nylon 66, nylon 12 and nylon 6/66/12 terpolymer may be used. As the polyester fibers, fibers made of a homopolymer or copolymer such as a polyethyleneterephthalate, polybutylene telephthalate, polyethylene-2,6-naphthalate, polyoxyethyoxybenzoate and entire aromatic polyester.

(4) Preformed Sheet

A one-way preformed sheet is produced by weaving relatively thick, flexible preformed yarns in which a bundle of the thus obtained carbon fibers is covered with a thermoplastic resin and either one of relatively thin thermoplastic resin fiber yarns and a bundle of relatively thin carbon fibers, as warps and wefts, respectively or vice versa.

Such a preformed sheet is disclosed in Japanese patent application Laid-Open No. 2-80,639 in the names of Across Co., Ltd., et al. In the preformed yarn, the diameter of the relatively thin thermoplastic resin fiber yarn or that of a bundle of the relatively thin carbon fibers is not more than ⅕ of that of the preformed yarn, and weaving is effected such that a relatively low tension is given to the relatively thin thermoplastic resin fiber yarn or a bundle of the relatively thin carbon fibers, whereas a relatively high tension is given to the preformed yarn.

The thermoplastic resin fiber yarns to be used as warps or wefts in the performed sheet are resin fiber yarns which may be completely melted at a molding temperature in a post-treatment. For example, polymers such as polyamide, polyester, polyethylene, polypropylene, polystyrene, polyfluoride vinylidene, polyamideimide, polyimide, polyetherimide, polyethersulfone, polyetherether ketone, and polyphenylene sulfide may be recited as such a thermoplastic resin. More specifically, as the polyamide fibers, fibers made of a homopolymer or copolymer such as nylon 66, nylon 6, nylon 12 and nylon 6/66/12 terpolymer may be used. As the polyester fibers, fibers obtained from a homopolymer or copolymer such as a polyethyleneterephthalate, polybutylene telephthalate, polyethylene-2,6-naphthalate, polyoxyethyoxybenzoate and entire aromatic polyester may be used. As the thermoplastic resin fiber yarns, yarns as thin as possible are preferably used. The thermoplastic resin fiber having the diameter of not more than ⅕ of that of the preformed yarn is preferably used from the standpoint of maintaining straight linearity of the preformed yarn and almost diminishes the reduction in strength during the post treatment.

As regards the mixed weaving ratio between the preformed yarns and the thermoplastic resin fibers, this mixed weaving ratio varies depending upon the ratio in content between the reinforcing fibers and the thermoplastic resin as well as upon the use of the molding of the C/C composite material. It is ordinarily preferable that the mixed weaving ratio of the reinforcing fibers to the entire preformed sheet is in a range of about 3 vol % to about 70 vol %.

The process for producing the C/C composite spring members according to the present invention will be explained.

(1) Helical Spring

The thus obtained raw preformed yarns shaped in a yarn-, tape- or sheet-shaped form as a starting material is helically wound around a core rod together with a space-holding coil member (spacer) such that turns of the preformed yarn are alternatively arranged alternatively with those of the space-holding coil member (spacer). Then, the wound preformed yarn is molded by hot pressing at about 300° C. to 2000° C. under a pressure of up to 500 kg/cm². Then, after the coil member (spacer) is removed from the molded body, the molding is carbonized at 700° C. to 1200° C. if necessary, and then graphitized at 1500° C. to 3000° C. Thereby, a helical spring made of a C/C composite material is obtained.

If the temperature in the hot pressing is less than 300° C., the matrix of the C/C composite material cannot be fully carbonized, and the molding cannot be produced as desired. Therefore, the temperature of less than 300° C. is not preferable. The hot pressing pressure of more than 500 kg/cm² is not preferable, because a hot pressing device needs to have a large scale.

When the molding is hot pressed at a temperature of not less than 300° C., preferably of not less than 500° C., almost no volatile component remains in the molding. Therefore, when the hot pressed molding is graphitized, no gas is generated, and the molding is almost free from voids with the result that the C/C composite material having sufficient strength can be obtained without repeating the impregnating treatment, the carbonizing treatment and the graphitizing treatment.

As mentioned above, the hot pressed molding is carbonized at a temperature of about 700° C. to about 1200° C., if necessary, and then graphitized at a temperature of about 1500° C. to about 3000° C., thereby obtaining the C/C composite material.

Next, another process for producing the spirally coiled spring made of the C/C composite material will be explained below.

The raw preformed yarns are converted to a sheet-shaped form. Such sheets of the preformed yarns are laminated one upon another, which are molded in a block-shaped form by hot pressing at 300° to 2000° C. under pressure. After being carbonized at 700° C. to 1200° C. if necessary, the molding is graphitized at 1500° to 3000° C. to obtain a block made of the C/C composite material. Then, a helical spring coil made of the C/C composite material is obtained by machining the block.

As the above blocks, those having various shapes such as rectangular sectional shapes or cylindrical shapes may be used. As the mechanically grinding step, the laminate molding is machined by using a lathe to obtain a cylindrically machined body having desired inner and outer diameters, and then the helical spring filament is formed by using the lathe or a grinder.

With respect to the C/C composite material, the similar spring member may be produced by using the C/C composite material made by the CVD process or the impregnation process.

Production of C/C Composite Washers

C/C composite washers can be produced as follows:

(1) Raw preformed yarns are used in the form of a yarn member, a taper form or a sheet form in which the raw preformed yarns are arrayed, and the member is wound around a core rod together with a space-holding coil member (spacer) by one turn or a plurality of turns such that turns of the raw preformed yarn and turns of the spacer may be alternatively arranged. The coiled member is molded by hot pressing at about 300°–2000° C. under a pressure of up to 500 kg/cm². The space is removed from the resulting molding, and the molding is carbonized at 700° C.–1200° C., if necessary. Then, the molding is graphitized at 1500° C.–3000° C. When the yarn is coiled by one turn only, the graphitized molding is used as a washer as it is. When the yarn is coiled by plural turns, the graphitized molding is cut into plural C/C composite washers each having one turn.

(2) Raw preformed yarns are formed in a sheet form, and laminated together. The resulting laminate is molded by hot pressing at about 300° C. about to 2000° C. under application of ordinary pressure to 500 kg/cm², which is carbonized at 700° C.–1200° C., if necessary. The resulting molding is graphitized at 1500° C.–3000° C., thereby obtaining a block made of a C/C composite material. A C/C composite washer is obtained by machining the thus obtained block.

(3) C/C composite washers may be obtained by the impregnation process or the CVD process other than the processes using the preformed yarns as in the case of the C/C composite spring.

Production of Laminated Leaf Springs and Dish Springs

Laminated leaf springs and dish springs may be produced in the same way as in the case of the washers.

The C/C composite material may be used alone, or the composite material may be used in the state that the surface of the C/C composite material is provided with an appropriate coating for preventing oxidation and/or carburizing or for smoothing the surface may be used.

As the coating, a ceramic material such as SiC, TiC, ZrC, WC, TiN, ZrN, AlN, BN, $Si_3N_4$, $Al_2O_5$, $TiO_2$, $Cr_2O_5$, or $SiO_2$, a metal such as Cr, Zr, Ti, Si or B, glass, glassy carbon, etc. may be used.

The ceramic material to be incorporated in the matrix of the C/C composite material constituting the spring member or to cover the surface of the spring member may be (1) an anti-abrasion material selected from the group consisting of TiC, TiN, ZrC, WC, SiC, $B_4C$ and AlN, (2) an acid-resistant material selected from the group consisting of SiC, $Si_3N_4$, Bn, Al, Zn, $AlPO_4$ and $Al_2O_3$, (3) a carburization-preventing material selected from the group consisting of $Si_3N_4$, BN, AlN and SiC, (4) a surface hardness-enhancing material selected from the group consisting of TiC, SiC, TiN, AlN, and HfN, (5) a surface-smoothing agent selected from the group consisting of BN, SiC and TiC. Each of the ceramic materials recited in the above groups may be employed alone or in combination.

The amount of the ceramic material to be incorporated into the matrix of the C/C composite material and the thickness of the coating film formed on the surface of the spring member may be selectively determined depending upon the use condition, etc. Ordinarily, the amount of the ceramic material to be incorporated into the matrix of the C/C composite material of the spring is in a range of 0.1–50 wt %, preferably 3 to 30 wt %. The ceramic material may be preliminarily incorporated when the preformed yarn is formed yarns. In the case of the coating, the thickness of the coating film is preferably 1 to 500 μm, more preferably 2 to 300 μm with respect to any of the coating films (the antiabrasion film, the anti-acidic film, the carburation-preventing film, the surface hardness-enhancing film, and the surface-smoothing film).

In order to effect the coating, use made be of a conventional process such as the CVD process, the PVD process, the ion plating process, the spatting process, the flame spraying process, the aqueous glass-coating process, the laser beam vapor deposition process, the plasma flame spraying process, the metal lining process, or the painting process. The coating may be applied directly to the spring member as the final product or preliminarily applied to the C/C composite material.

The spring members according to the present invention can be used at temperatures of around 3000° C. which is the maximum treating temperature for the raw material. The physical properties of the helical spring are recited, for example a density of 1.5 to 3.0 g/cm$^3$, and a spring constant of 0.1 to 25 kg/mm.

Since the spring member according to the present invention has extremely high thermal resistance, the spring member may be used in a large heat load place, for example, as a spring for a disc brake for automobiles.

Specific Embodiments of the Pesent Invention

Next, the present invention will be explained in more detail with reference to specific embodiments shown in the attached drawings.

FIGS. 1 through 6 show helical springs made of the C/C composite material. Opposite ends 3, 4 of a helical spring body 2 of the spring 1 are to be supported by supporting members not shown. The spring of FIG. 1 has a helical wire member having a rectangular sectional shape, and a helical wire member of the spring of FIG. 2 has a circular cross sectional shape. In the spirally coiled spring of FIG. 3, a helical wire member has a rectangular sectional shape, but the thickness of the wire member is made greater in a central portion 5 than in opposite end portions 6 near opposite ends 3 and 4.

When the sectional area of the wire member is varied like this, the spring constant can be advantageously changed in multiple stages depending upon the compression stroke.

In FIGS. 4 through 6, the wire member of the spring has a rectangular cross section. FIG. 4 illustrates a helical spring 1 in which a spring body 2 is throttled in a central portion. FIG. 5 illustrates a helical spring in which a spring body 2 is swelled in a central portion. FIG. 6 illustrates a helical spring 1 in which a spring body 2 is swelled at two, upper and lower, portions.

Figure 7:
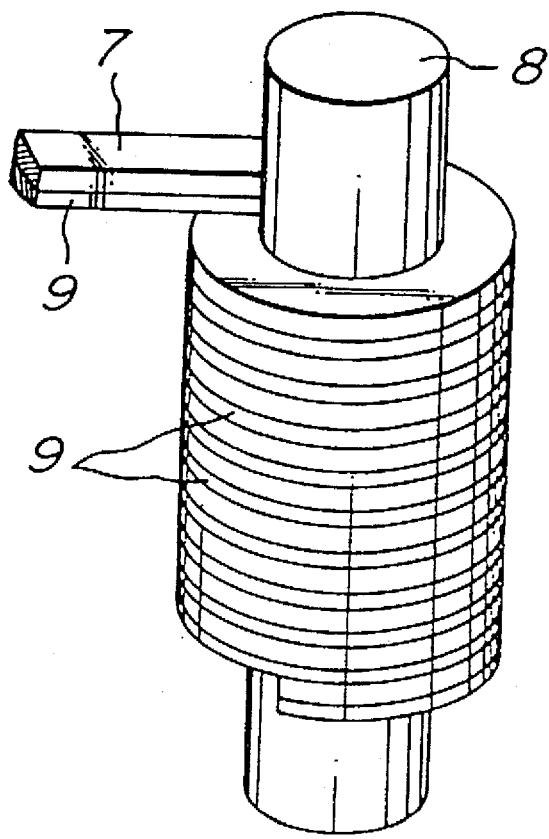
FIG. 7 is a perspective view for schematically illustrating a process for producing a helical spring member made of the carbon fibers/carbon composite (C/C composite material) material according to the present invention.
Figure 8A:
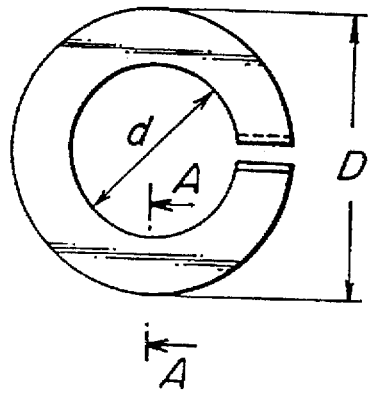
FIGS. 8(a), 8(b) and 8(c) illustrate a spring washer as a further embodiment made of the carbon fibers/carbon composite material (C/C composite material) according to the present invention.
Figure 8B:
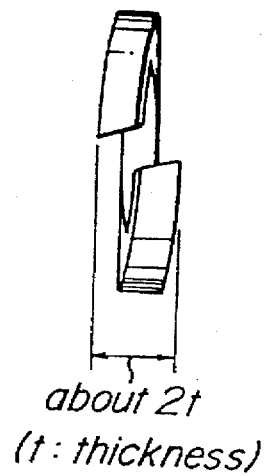
Figure 8C:
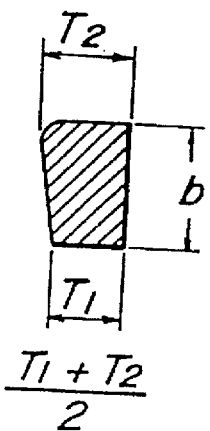
Figure 9A:
FIGS. 9(a) and 9(b) illustrate a flat washer as a still further embodiment made of the carbon fibers/carbon composite material (C/C composite material) according to the present invention.
Figure 9B:
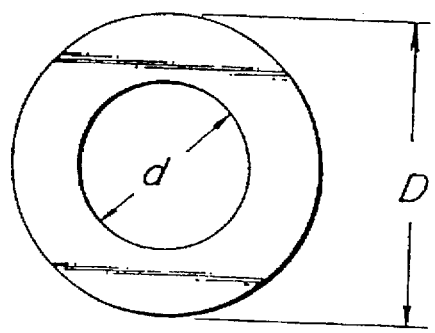

FIG. 7 is a view for illustrating a process for forming a helical spring as shown in FIG. 1 by helically winding a wire member 7 around a core rod 8 together with a spacer 9.

FIGS. 8 through FIG. 11 illustrate other spring members according to the present invention. FIGS. 8(a), 8(b) and 8(c) illustrate a spring washer. FIGS. 9(a) and 9(b) illustrate a flat washer. FIGS. 10(a) and 10(b) illustrate a laminated spring, and FIG. 11 illustrates a coned disc spring.

All of the various types of spring members according to this invention are made of a carbon fibers/carbon composite material dispersed in a matrix composed mainly of graphite, and the spring members have a spring constant in a range of 0.1 to 25 kg/mm. Also, the spring members have a density of about 1.5 up to about 3.0 g/cm$^3$.

The volume percentage of the carbon fibers in the composite material is 10 to 80%, preferably 20 to 70%.

Preferably, all of the various types of spring embers, especially those to be used under high temperature severe conditions, will have at least their surface including at least one ceramic material, for example in the form of a surface layer, as described above concerning the production of laminated leaf springs and disk springs.

The reasons for the ranges for the spring constant and density are as follows. If the spring constant is less than 0.1 kg/mm, the spring has a very low stress resistance so that it cannot be effectively used as a mechanical element. Since the spring is deformed with a small force, it is difficult to adjust the deformed amount of the spring. To the contrary, if the spring constant is more than 25 kg/mm, a large deforming force is necessary, which is not practical. On the other hand, if the density is less than 1.5 g/cm$^3$, appropriate spring performance cannot be obtained. In that case, other characteristics such as wear resistance deteriorate. To the contrary, if the density is more that 3 g/cm$^3$ weight reduction, energy saving, etc. cannot be realized or expected.

Experiments

Next, results of spring performance comparison tests are shown below with respect to specific spring members made of the C/C composite materials according to the present invention.

EXAMPLE 1

Raw preformed yarns containing 40 vol % of PAN-based carbon fibers (Vf=40%) (number of filaments: 12,000, each filament: 0.6 denier) were converted into a yarn member with a sleeve of nylon 6 (20 μm thick), which was helically coiled around a core rod together with a space-holding coil (spacer) so that the preformed yarn member and the spacer might be alternatively arranged. The helical yarn member was molded by hot pressing at about 600° C. under pressure of 100 kg/cm$^2$. After the coil (spacer) was removed from the molding, the molding was. carburated at 800° C., and graphitized at 2000° C. to obtain a helical spring made of the C/C composite material. Physical properties of the helical spring had the following physical properties and dimensions.

Density of the final spring: 1.6 g/cm$^3$, outer diameter: 50 mm, inner diameter: 20 mm, free-state length: 40 mm, maximum load: 15 kg, maximum displacement: 6 mm, spring constant: 2.5 kg/mm In the above, the maximum load means a load under which the helical spring is completely compressed when the spring is a compression spring. Further, the maximum displacement means an axially positional displacement between the original position of the spring under no load and a position of the spring under the maximum load.

EXAMPLE 2

A helically coiled resin molding reinforced by PAN-based carbon fibers (number of filaments: 3000, each filament: 0.6 denier) was carbonized by firing, and subjected repeatedly to impregnation with an epoxy resin and carbonization, thereby obtaining a helical spring made of a C/C composite material. The content of the carbon fibers in the resin molding was 40 vol %. The spring was graphitized at 2000° C.

Physical properties of the helical spring had the following physical properties and dimensions.

Density of the final spring: 1.5 g/cm$^3$, outer diameter: 20 mm, inner diameter: 10 mm, free-state length: 20 mm, maximum load: 2 kg, maximum displacement: 8 mm, spring constant: 0.25 kg/mm.

EXAMPLE 3

Raw preformed yarns containing 30 vol % of PAN-based carbon fibers (Vf=30%) (number of filaments: 6000, each filament: 0.6 denier) were converted into a yarn member with a sleeve of polyethylene (10 μm thick), which was helically Coiled around a core rod together with a space-holding coil (spacer) so that the preformed yarn member and the spacer might be alternatively arranged. The-helical yarn member was molded by hot pressing at about 600° C. under a pressure of 100 kg/cm$^2$. After the coil (spacer) was removed from the molding, the molding was carburated at 800° C., and graphitized at 2000° C. to obtain a helical spring made of the C/C composite material. Physical properties of the helical spring had the following physical properties and dimensions.

Density of the final spring: 1.8 g/cm³, outer diameter: 15 mm, inner diameter: 5 mm, free-state length: 20 mm, maximum load: 1 kg, maximum displacement: 10 mm, spring constant: 0.1 kg/mm.

EXAMPLE 4

Raw preformed yarn containing 50 vol % of PAN-based carbon fibers (Vf=50%) (number of filaments: 12,000, each filament: 0.6 denier) were converted into a yarn member with a sleeve of polypropylene (30 μm thick), which was helically coiled around a core rod together with a space-holding coil (spacer) so that the preformed yarn member and the spacer might be alternatively arranged. The helical yarn member was molded by hot pressing at about 600° C. under a pressure of 100 kg/cm². After the coil (spacer) was removed from the molding, the molding was carburated at 800° C., and graphitized at 2000° C. to obtain a helical spring made of the C/C composite material. Physical properties of the helical spring had the following physical properties and dimensions.

Density of the final spring: 2.2 g/cm³, outer diameter: 45 mm, inner diameter: 10 mm, free state length: 24 mm, maximum load: 20 kg, maximum displacement: 2 mm, spring constant: 10 kg/mm.

EXAMPLE 5

Raw preformed yarns containing 40 vol % of PAN-based carbon fibers (Vf=40%) (number of filaments: 12,000, each filament: 0.6 denier) were converted into a flat tape, 0.8 mm thick and 6 mm wide, including a sleeve of polypropylene (10 μm thick), which was helically coiled around a core rod together with a space-holding coil (spacer) so that the preformed yarn and the coil (spacer) might be alternatively arranged and wider faces of adjacent turns of the tape might be opposed to each other through a turn of the coil (spacer). The helically coiled tape was molded by hot pressing at about 600° C. under a pressure of 100 kg/cm². After the coil (spacer) was removed from the molding, the molding was carburated at 800° C., and graphitized at 2000° C. to obtain a helical spring made of the C/C composite material. Physical properties of the helical spring had the following physical properties and dimensions.

Density of the final spring: 1.6 g/cm³, outer diameter: 37 mm, inner diameter: 27 mm, free-state length: 60 mm, maximum load: 14 kg, maximum displacement: 7 mm, spring constant: 2 kg/mm.

EXAMPLE 6

Raw preformed yarns containing 40 vol % of PAN-based carbon fibers (Vf=40%) (number of filaments: 12,000, each filament: 0.6 denier) were converted into a sheet, 0.8 mm thick and 55 mm wide, including a sleeve of nylon 66 (20 μm thick), which was helically coiled around a core rod together with a space-holding coil (spacer) so that the preformed yarn and the coil (spacer) might be alternatively arranged and wider flat faces of adjacent turns of the sheet might be opposed to each other through a turn of the coil (spacer). The helical coiled yarn was molded by hot pressing at about 600° C. under pressure of 150 kg/cm². After the coil (spacer) was removed from the molding, the molding was carburated at 800° C., and graphitized at 2000° C. to obtain a helical spring made of the C/C composite material. Physical properties of the spirally coiled spring had the following physical properties and dimensions.

Density of the final spring: 1.7 g/cm³, outer diameter: 300 mm, inner diameter: 200 mm, free-state length: 150 mm, maximum load: 500 kg, maximum displacement: 50 mm, spring constant: 7 kg/mm.

EXAMPLE 7

Raw preformed yarns having the content of 40 vol % of PAN-based carbon fibers (number of filaments: 12,000, each filament: 0.6 denier) were converted into a sheet, 0.8 mm thick and 100 mm wide, including a sleeve of polypropylene (20 μm thick). Such sheet were laminated one upon another, and the laminate was molded in the form of a block by hot pressing at about 600° C. under a pressure of 100 kg/cm². The molding was carbonized at 800° C., and graphitized at 2000° C., thereby obtaining a block of the C/C composite material. The block was machined to form a helical spring having the following physical properties and dimensions.

Density of the final spring: 17 g/cm³, outer diameter: 30 mm, inner diameter: 15 mm, free-state length: 30 mm, maximum load: 5 kg, maximum displacement: 5 mm, spring constant: 1 kg/mm.

EXAMPLE 8

The C/C composite helical spring obtained in Example 1 was repeatedly subjected to a heating test by which the spring was heated to 1200° C. while being kept loaded at 15 kg. Then, the physical properties and dimensions were measured and the results are shown below.

Density of the final spring: 1.6 g/cm³, outer diameter: 50 mm, inner diameter: 20 mm, free-state length: 40 mm, maximum load: 15 kg, maximum displacement: spring constant: 2.5 kg/mm.

As shown in Table 1, no change occurred on the spring constant.

Comparative Example 1

A helical spring was prepared from Inconel, and heated to 1200° C. under a load of 15 kg. The spring constant was 1.5 before heating it to 1200° C. However, the spring was deformed after being heated to 1200° C., which prevented practical use of the spring as a spring.

Comparative Example 2

A helical spring was prepared from silicon nitride, and repeatedly heated to 1200° C. under a load of 15 kg. The spring constant was 2.0 before heating it to 1200° C. However, the spring constant changed after heating at 1200° C. Table 1 shows changes of the spring constant.

|  | Example 8 | Comparative Example 1 | Comparative Example 2 |
|---|---|---|---|
| Before heating Number of times of heating | 2.5 | 1.5 | 2.0 |
| 1 | 2.5 | deformed | 1.8 |
| 50 | 2.5 | — | 1.5 |
| 100 | 2.5 | — | 0.7 |

EXAMPLE 9 (Spring Washer)

Raw preformed yarns having the content of 40 vol % of PAN-based carbon fibers (Vf=40%) (number of filaments: 12,000, each filament: 0.6 denier) were converted into a yarn member with a sleeve of polypropylene (20 μm thick), which was wound around a core rod together with a space-holding coil (spacer) by one turn only. The wound yarn was molded by hot pressing at about 600° C. under application of a pressure of 100 kg/cm². The spacer was removed from the molding, and the molding was carbonized at 800° C. and then graphitized at 2000° C., thereby obtaining a C/C composite spring washer. The physical properties of the spring washer are as follows: Density: 1.6 g/cm³, outer diameter: 18.4 mm, inner diameter: 10.2 mm, width: 3.7 mm, thickness: 2.5 mm.

The above spring washer was tightened by a bolt and nuts made of the C/C composite material and having an internal diameter of 10 mm, and heated to 1200° C. Then, the bolt and the nuts were removed from the spring washer. As a result, it was revealed that no dimensional change occurred in the spring washer.

Comparative Example 3 (Spring Washer)

A spring washer made of Inconel was tightened by a bolt and nuts made of the C/C composite material and having an internal diameter of 10 mm, and heated to 1200° C. Then, the bolt and the nuts were removed from the spring washer. As a result, it was revealed that the Inconel spring washer was deformed, which disabled use of the washer as an effective washer.

Comparative Example 4 (Spring Washer)

A spring washer made of silicon nitride was tightened by a bolt and nuts made of the C/C composite material and having an internal diameter of 10 mm, and heated to 1200° C. Then, the bolt and the nuts were removed from the spring washer. As a result, it was revealed that the height of the silicon nitride spring washer decreased.

EXAMPLE 10 (Spring Washer)

Raw preformed yarn having the content of 40 vol % of PAN-based carbon fibers (Vf=40%) (number of filaments: 12,000, each filament: 0.6 denier) were converted into a yarn member 0.8 mm thick and 100 mm in width, including a sleeve of polypropylene (20 μm thick), which was wound around a core rod together with a space-holding coil (spacer) by ten turns such that turns of the yarn member and those of the spacer might be alternatively arranged. The wound yarn member was molded by hot pressing at about 600° C. under application of a pressure of 100 kg/cm². The spacer was removed from the molding, and the molding was carbonized at 800° C. and then graphitized at 2000° C. Ten C/C composite spring washers having one turn were obtained by cutting the graphitized molding. The physical properties of the spring washer are as follows:

Density: 1.6 g/cm³, outer diameter: 28 mm, inner diameter: 16.2 mm, width: 5.2 mm, thickness: 4 mm.

One of the above spring washers was tightened by a bolt and nuts made of the C/C composite material and having an internal diameter of 16 mm, and heated to 1200° C. Then, the bolt and the nuts were removed from the spring washer. As a result, it was revealed that no dimensional change occurred in the spring washer.

EXAMPLE 11 (Flat Washer)

Raw preformed yarns having the content of 40 vol % of carbon fibers (Vf=40%) were converted into a sheet form, and such sheets were laminated together. The laminate was molded by hot pressing at about 600° C. under application of a pressure of 100 kg/cm². The molding was carbonized at 800° C. and then graphitized at 2000° C., thereby obtaining a plate made of a C/C composite material. A C/C composite flat washer was obtained by machining the C/C composite plate. The physical properties of the flat washer are as follows:

Density: 1.6 g/cm³, outer diameter: 37 mm, inner diameter: 22 mm, thickness: 3.2 mm The above flat washer was tightened by a bolt and nuts made of the C/C composite material and having an inner diameter of 200 mm, and heated to 1200° C. Then, the bolt and the nuts were removed from the spring washer. As a result, it was revealed that no dimensional change occurred in the spring washer.

Comparative Example 5 (Flat Washer)

A flat washer made of Inconel was tightened by a bolt and nuts made of the C/C composite material and having an inner diameter of 20 mm, and heated to 1200° C. Then, the bolt and the nuts were removed from the flat washer. As a result, it was revealed that the Inconel flat washer was compressed by the bolt and nuts, which prevented effective use of the washer as a washer.

EXAMPLE 12 (Laminated Spring)

Raw preformed yarns having the content of 40 vol % of PAN-based carbon fibers (Vf=40%) (number of filaments: 12,000, each filament: 0.6 denier) were converted into a sheet form, 0.8 mm thick and 100 mm wide, including a sleeve of polypropylene (20 μm thick), and such sheets were laminated together. The laminate was molded by hot pressing at about 600° C. under application of a pressure of 100 kg/cm². The molding was carbonized at 800° C. and then graphitized at 2000° C., thereby obtaining a plate made of a C/C composite material. A C/C composite laminated spring was obtained by machining the C/C composite plate. Three laminated springs each had a width of 50 mm, a thickness of 8 mm and a total length of 600 mm. The spring constant of the thus obtained laminated spring was 2.1 kg/mm.

EXAMPLE 13 (Coned Disk Spring)

Raw preformed yarns having the content of 40 vol % of PAN-based carbon fibers (Vf=40%) (number of filaments: 12,000, each filament: 0.6 denier) were converted into a sheet form, 0.8 mm thick and 150 mm wide, including a sleeve of polypropylene (20 μm thick), and such sheets were laminated together. The laminate was molded by hot pressing at about 600° C. under application of a pressure of 100 kg/cm². The molding was carbonized at 800° C. and then graphitized at 2000° C., thereby obtaining a plate made of a C/C composite material. A C/C composite coned disk spring was obtained by machining the C/C composite plate. The coned disk spring having an outer diameter "D" of 100 mm, an inner diameter "d" of 50 mm, a thickness "t" of 3 mm and a height "h" of 1.5-mm was obtained by machining the C/C composite plate.

As mentioned-above, since the spring member according to the present invention is made of the C/C composite material, the spring member has a lighter weight, higher abrasion resistance, corrosion resistance, chemical resistance and toughness than the metal springs. Further, the spring member of the present invention has higher mechanical impact resistance, heat resistance and heat impact resistance than ceramic springs. According to the present invention, the spring members having the above various advantages can be produced at inexpensive costs.

EXAMPLE 14 (TiN Coating)

The surface of the spring member made of the C/C composite material in Example 1 was coated with a film of TiN (titanium nitride) in a thickness of 10 μm by ion plating.

Each of the thus coated spring member and the non-coated one obtained in Example 1 was slid with an opposed member made of stainless steel at a sliding speed of 1 m/sec. under a plane pressure of 5 kg/cmhu 2 for 2 hours. Worn amounts of the spring members are as follows.

| | |
|---|---|
| Worn amount of the coated spring member | 0.22 mm |
| Worn amount of the non-coated spring member | 0.36 mm |

Thus, it is seen that the abrasion resistance of the coated spring member could be well improved as compared with the non-coated one.

EXAMPLE 15 (AlPO4 Coating)

The surface of the spring member made of the C/C composite material in Example 1 was coated with a film of AlPO4 (aluminum phosphate) in a thickness of 50 μm by the aqueous glass coating process using a coating liquid with much silica as a binder.

After each of the thus coated spring member and the non-coated one obtained in Example 1 was subjected to a temperature of 1200° C. for one hour, their spring constants were measured. Results are as follows.

| | |
|---|---|
| Coated spring member | 2.5 kg/cm$^2$ |
| Non-coated spring member | 1.3 kg/cm$^2$ |

Thus, it is seen that the oxidation resistance of the coated spring member could be well improved as compared with the non-coated one.

EXAMPLE 16 (SiC Coating)

The surface of the spring member made of the C/C composite material in Example 1 was coated with a film of SiC (silicon carbide) in a thickness of 40 μm by the CVD process. A stainless steel article (Automobile part element) was placed on each of the coated spring member and the non-coated spring member, and they were then placed in a brazing furnace for 3 hours. After the spring members were taken out, the surface state of the spring member was observed. Results are as follows.

| | |
|---|---|
| Coated spring member | No carburization was observed. |
| Non-coated spring member | Carburization was observed. |

EXAMPLE 17

A spring member was obtained in the same way as in Example 1 except that use was made of preformed yarns in which the content of the carbon fibers (Vf) was 40% by volume and AlN (aluminum nitride) was incorporated into the C/C composite material in an amount of 20% by weight. The characteristics of the thus obtained spring member was as follows.

| | | | |
|---|---|---|---|
| Density | 2.2 g/cm$^3$ | | |
| Outer diameter | 50 mm | Inner diameter | 20 kg |
| Free length | 35 mm | Maximum load | 20 kg |
| Maximum displacement | 5 mm | | |
| Spring constant | 4 kg/mm | | |

Each of the above spring member and one obtained in Example 1 was exposed to a temperature of 1100° C. for 3 hours in air, and their spring constants were measured. Results are as follows.

| | Before testing | After testing |
|---|---|---|
| AlN-incorporated spring member | 4 kg/cm$^2$ | 4 kg/cm$^2$ |
| Spring member containing no AlN | 2.5 kg/cm$^2$ | 1.2 kg/cm$^2$ |

Thus, as compared with the spring member in Example 1, the spring member containing AlN had a far higher spring constant, and exhibited higher oxidation resistance.

What is claimed is:

1. A spring member comprising a carbon fibers/carbon composite material, said composite material comprising carbon fibers and a matrix composed mainly of graphite, said carbon fibers being dispersed in said matrix, wherein a spring constant of the spring member is in a range of 0.1 to 25 kg/mm and a density of the spring member is in a range of 1.5 to 3.0 g/cm$^3$.

2. The spring member set forth in claim 1, wherein a volume percentage of the carbon fibers in the composite material is 10 to 80%.

3. The spring member set forth in claim 2, wherein the volume percentage of the carbon fibers in the composite material is 20 to 70%.

4. The spring member set forth in claim 1, which is selected from the group consisting of a helical compression spring, a helical tension spring, a spring washer, a flat washer, a laminated spring, a torsion spring, a garter spring, a volute spring, a torsion far spring, a spiral spring, a conical spring, a contacted type spiral spring, a coned disk spring, ring spring, a retaining ring, a spring pin, a spring plate nut, and a spring for seat.

5. The spring member according to claim 1, wherein at least the surface of the spring member includes at least one ceramic material.

6. The spring member according to claim 5, wherein said at least one ceramic material covers the surface of the spring member in the form of a surface layer.

7. The spring member according to claim 6, wherein said at least one ceramic material is an anti-abrasion material selected from the group consisting of TiC, TiN, ZrC, WC, SiC, B$_4$C and AlN.

8. The spring member according to claim 6, wherein said at least one ceramic material is an acidresistant material selected from the group consisting of SiC, Si$_3$N$_4$, BN, Al, Zn, AlPO$_4$ and Al$_2$O$_3$.

9. The spring member according to claim 6, wherein said at least one ceramic material is a carburization-preventing material selected from the group consisting of Si$_3$N$_4$, BN, AlN and SiC.

10. The spring member according to claim 6, wherein said at least one ceramic material is a surface hardness-enhancing material selected from the group consisting of TiC, SiC, TiN, AlN, and HfN.

11. The spring member according to claim 6, wherein said at least one ceramic material is a surface-smoothing agent selected from the group consisting of BN, SiC and TiC.

12. The spring member according to claim 6, which is selected from the group consisting of a helical compression spring, a helical tension spring, a spring washer, a flat washer, a laminated spring, a torsion spring, a garter spring, a volute spring, a torsion far spring, a spiral spring, a conical spring, a contacted type spring, a coned disc spring, a ring spring, a retaining ring, a spring pin, a spring plate nut, and a spring for seat.

13. The spring member according to claim 12, wherein at least the surface of the spring member includes at least one ceramic material.

14. The spring member according to claim 5, wherein said at least one ceramic material is an anti-abrasion material selected from the group consisting of TiC, TiN, ZrC, WC, SiC, $B_4C$ and AlN.

15. The spring member according to claim 5, wherein said at least one ceramic material is an acid-resistant material selected from the group consisting of SiC, $Si_3N_4$, BN, Al, Zn, $AlPO_4$ and $Al_2O_3$.

16. The spring member according to claim 5, wherein said at least one ceramic material is a carburization-preventing material selected from the group consisting of $Si_3N_4$, BN, AlN and SiC.

17. The spring member according to claim 5, wherein said at least one ceramic material is a surface hardness-enhancing material selected from the group consisting of TiC, SiC, TiN, AlN, and HfN.

18. The spring member according to claim 5, wherein said at least one ceramic material is a surface-smoothing agent selected from the group consisting of BN, SiC and TiC.

19. The spring member according to claim 5, which is selected from the group consisting of a helical compression spring, a helical tension spring, a spring washer, a flat washer, a laminated spring, a torsion spring, a garter spring, a volute spring, a torsion far spring, a spiral spring, a conical spring, a contacted type spring, a coned disc spring, a ring spring, a retaining ring, a spring pin, a spring plate nut, and a spring for seat.

20. The spring member according to claim 19, wherein at least the surface of the spring member includes at least one ceramic material.

21. The spring member according to claim 19, wherein said at least one ceramic material covers the surface of the spring member in the form of a surface layer.

22. The spring member according to claim 19, wherein said at least one ceramic material is an anti-abrasion material selected from the group consisting of TiC, TiN, ZrC, WC, SiC, $B_4C$ and AlN.

23. The spring member according to claim 19, wherein said at least one ceramic material is an acid-resistant material selected from the group consisting of SiC, $Si_3N_4$, BN, Al, Zn, $AlPO_4$ and $Al_2O_3$.

24. The spring member according to claim 19, wherein said at least one ceramic material is a carburization-preventing material selected from the group consisting of $Si_3N_4$BN, AlN and SiC.

25. The spring member according to claim 19, wherein said at least one ceramic material is a surface hardness-enhancing material selected from the group consisting of TiC, SiC, TiN, AlN, and HfN.

26. The spring member according to claim 19, wherein said at least one ceramic material is a surface-smoothing agents selected from the group consisting of BN, SiC and TiC.

* * * * *